Feb. 21, 1967 R. S. WENMAN 3,305,707

TRANSISTOR BIAS CIRCUITS

Original Filed March 30, 1961

2 Sheets-Sheet 1

INVENTOR.

Robert S. Wenman

BY

Strauch, Nolan & Neale

ATTORNEYS

INVENTOR
Robert S. Wenman
BY
ATTORNEYS

United States Patent Office 3,305,707
Patented Feb. 21, 1967

3,305,707
TRANSISTOR BIAS CIRCUITS

Robert S. Wenman, Lake Zurich, Ill., assignor to SCM Corporation, a corporation of New York
Original application Mar. 30, 1961, Ser. No. 103,183, now Patent No. 3,131,627, dated May 5, 1964. Divided and this application Apr. 23, 1964, Ser. No. 362,050
3 Claims. (Cl. 317—148.5)

Figure 1:
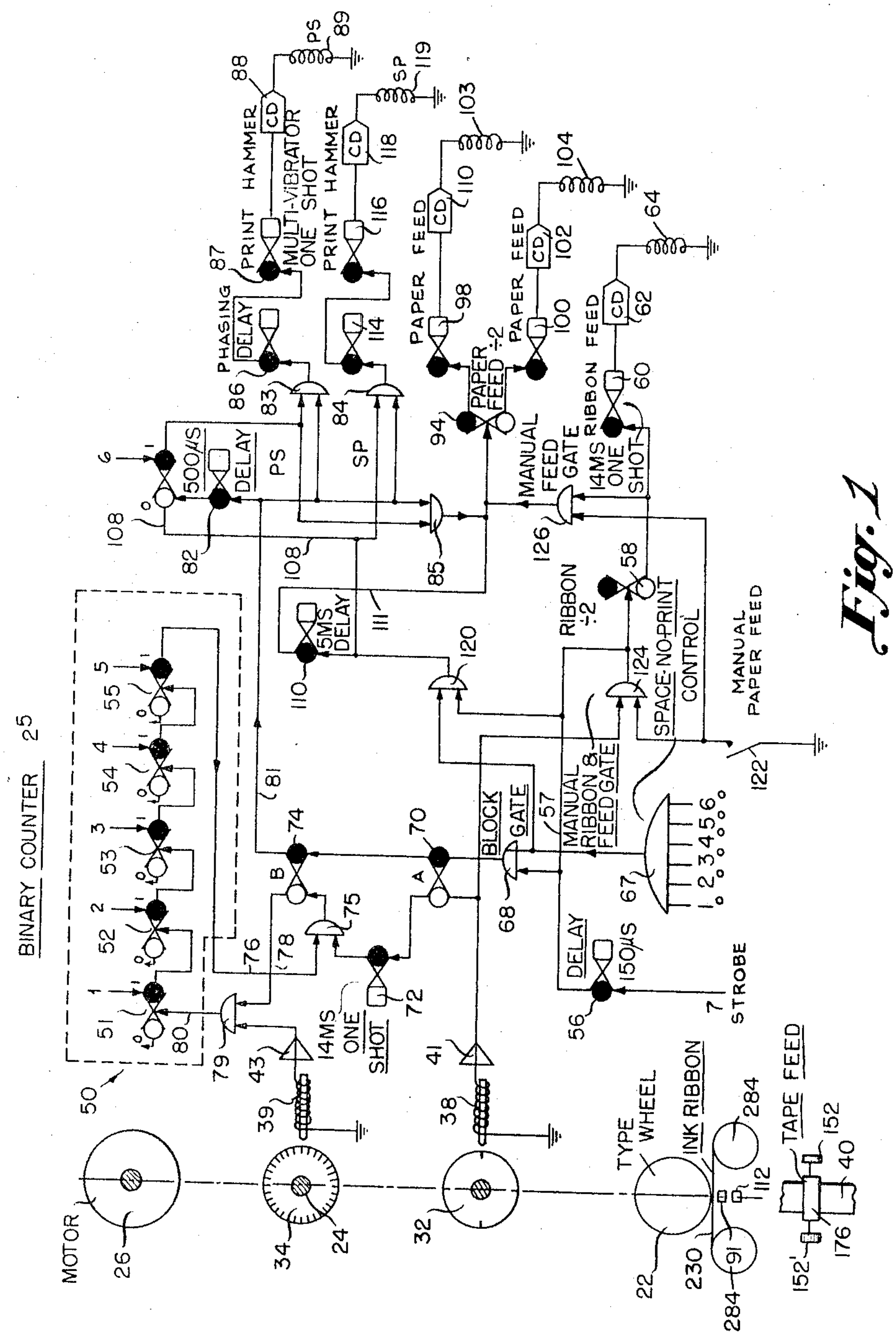

This invention relates to a transistor bias circuit and is exemplified by its use in a high speed printing apparatus designed to print a message, coded or otherwise, on a record medium, the message being received as electrical code signals which originate in a telegraphic or data processing system or other similar telegraphic mediums. This application is divided from co-pending parent application Serial No. 103,183 filed March 30, 1961, now Patent No. 3,131,627.

The exemplary printer uses, as a basic principle of operation, electronic selection and actuation of a desired one of two print hammers which are aligned to print a serial message on a tape from two rows of characters positioned around the periphery of a continuously rotating typewheel. The power circuits for various machine operations are transistorized and utilize the bias circuit of the present invention.

Briefly, the circuit of the present invention pertains to the use of a power transistor having current carrying capacity sufficient to operate a relay or solenoid, and being actuated by a driver transistor which in turn is keyed on and off as by a trigger circuit. In the driver bias circuit, a solid state diode is used which has a barrier potential greater than the barrier potential of the transistor, and the diode is connected between the base and another electrode of the transistor and so poled as to provide a cut-off bias for the transistor without any additional circuit connections or need for intermediate voltage taps from the power supply. In the particular circuit employed in the equipment embodying the present invention, the bias diode for the driver stage is connected directly between the base electrodes of both the power transistor and the driver transistor; one pole of this bias diode is connected to a point of varying potential in the trigger circuit through a second similar diode in the bias circuit for the normally non-conducting transistor of the trigger circuit to thereby provide a cascade arrangement obviating the need for a series of bias potential connections from the power supply or voltage divider networks.

The high speed printer embodiment, using the present invention, utilizes an electromagnetic impulse transducer form of typewheel position detector where a pulse is generated for each typewheel position starting from an indexing point (or points) and the pulse counts are compared with an incoming code signal in an electronic counter to determine the typewheel position. Print hammer actuation is then controlled by electronic impulses having a timed relationship to instantaneous shaft position to record any desired character. An early teaching of such an electromagnetic pulse transducing position detector with electronic counter for matching shaft and typewheel position with printing actuation may be seen in Patent No. 2,627,224 to Wolf, and a more recent and more refined version may be seen in U.S. Patents Nos. 2,938,193 and 2,954,731 (the latter two, however, being primarily concerned with multiple rows of typewheels for page printing). The mode of the printer operation using the transistorized circuits of the present invention could also be applicable to relatively low speed printers where shaft position impulses can be obtained by brushes and commutators.

A primary object of this invention resides in the provision of a multiple stage transistor power amplifier incorporating a novel cascade bias arrangement by which the cutoff bias potential of amplifying transistor devices is derived from a common power source and carried forward stage by stage, by means of semiconductor by-pass devices at each stage.

Figures 2, 2A, 2B, 2C:
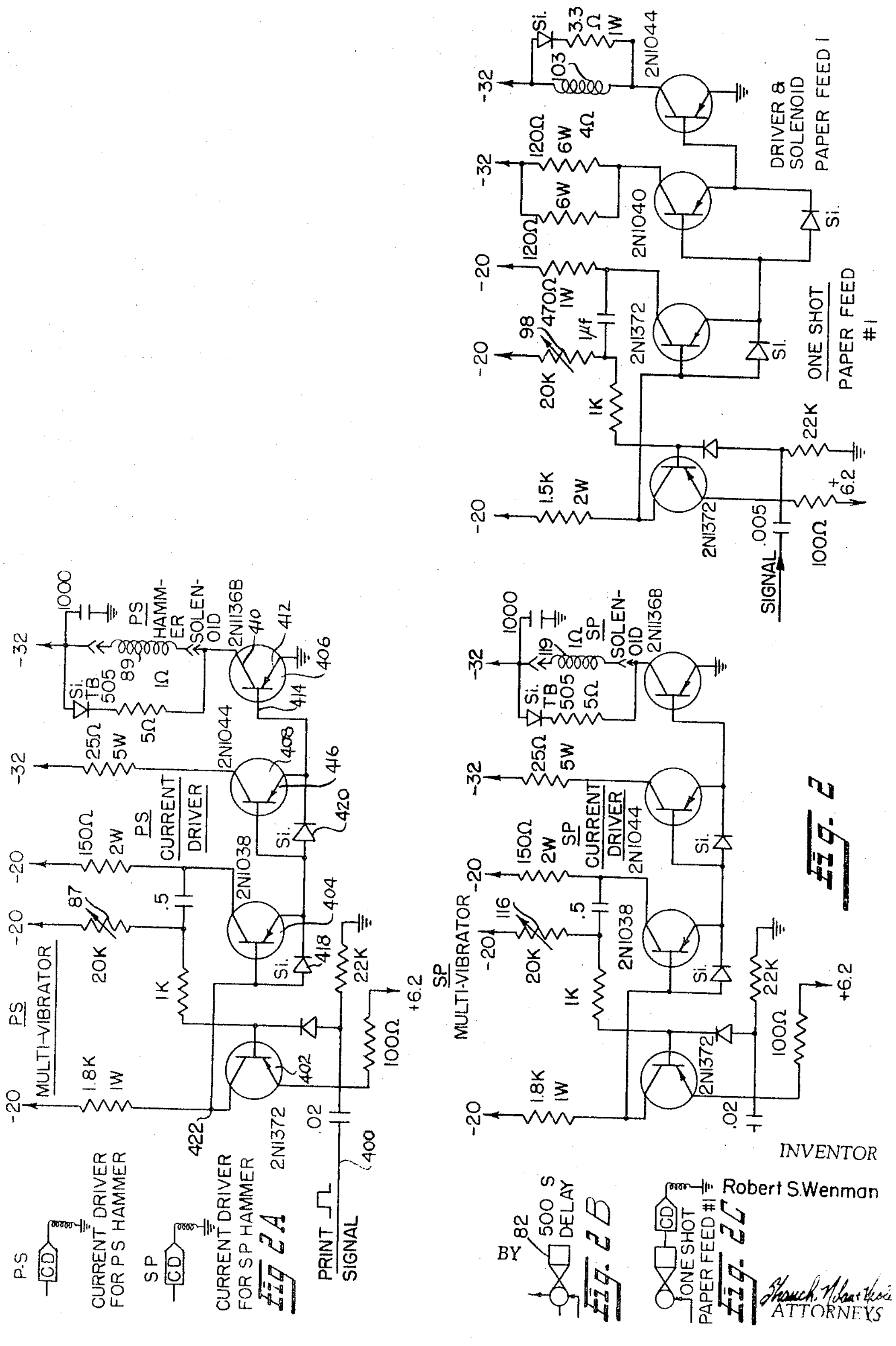

Further objects and advantages of the invention will be apparent from the following description and the appended claims taken in conjunction with the accompanying drawings showing a preferred embodiment thereof, in which:

FIGURE 1 is a block diagram of a printer incorporating transistor power circuits utilizing the present invention, the electronic control and mechanical components being illustrated by schematic symbols; and FIGURE 2 provides a detailed circuit diagram of exemplary transistorized power circuits using the biasing circuit in accord with the present invention. The detailed components of this circuit diagram correspond to a portion of the symbolized schematic diagram of the electronic components in FIGURE 1, the representative symbolized components being included as subscript FIGURES 2A, 2B and 2C to enable a correlation of that portion of the detailed circuit with the overall symbolized circuit of FIGURE 1.

Although the following detailed description is of a specific printer in accordance with the present invention, it is to be understood that the invention claimed here resides in the transistorized circuit illustrated in FIGURE 2. The depicted transistors in FIGURE 2 are specifically identified or are 2N1372, it being understood that equivalent transistors could be used. Diodes not marked are Germanium D1034. Silicon diodes are marked S1 and are SR162 unless otherwise indicated. All resistor values are noted in ohms and are ¼ watt unless marked otherwise. All capacity values are in $\mu\mu$f. unless marked otherwise.

*General description*

The general organization of the mechanical components of the printer is fully described in the aforenoted parent application and will be only generally referred to in connection with FIGURE 1. The printer 20 has a dual row typewheel 22 which, during printer operation, is constantly rotating, being secured on a shaft 24 suitably journalled in the frame of the machine (not shown) and is driven by a synchronous motor 26. Also secured to rotate with shaft 12 is a two (2) notched clock wheel 32 and a sixty-four (64) notched clock wheel 34. The two notches on clock wheel 32 are indexing points at the beginning-of-count position on the typewheel 22 while the sixty-four (64) notches 37 on clock wheel 34 are aligned with respect to the sixty-four character positions around the typewheel 22.

Clock wheels 32 and 34 are metallic discs made of high permeability magnetic material (such as wrought iron or mild steel), the notches in each, as the edges of the discs pass close to the magnetic pick-up members, causing a change in flux density in the magnetic field around the index coil 38 and impulse counting coil 39 of the pick-up members. This change in flux density induces a surge of current and a changing E.M.F. in the pick-up circuits. The voltage signal is amplified and shaped by respective amplifiers 41 and 43 (FIGURE 1) which feed the indexing and counting signals to the machine control circuits, to be hereinafter described.

The machine is a serial tape printer, it prints one character or symbol or causes a space function of a message one unit at a time in a single line on a tape, the character to be printed being chosen from one or the other of the inner row or the outer row of the dual row typewheel 22. In the preferred embodiment, the characters in one row are different from the characters in the other row. Thirty-two different print characters or symbols can be included in each row and are repeated at 180° intervals in the same row, thus it is possible for the typewheel to contain sixty-four different characters.

A paper tape 40 feeds from a supply roll (not shown) by mechanism described in detail in the aforenoted parent application. To aid in understanding, the inner typewheel row is on the incoming tape side and the outer typewheel row is on the tape feed-out side.

In order to serially print a message on the tape in this machine without overprinting and in order to operate the machine in a useful manner, the machine is capable of four basic modes of operation, now briefly described.

(1) If the character to be printed is located on the inner typewheel row, the machine will print first and then space the tape. This will be referred to as the "PRINT-SPACE" mode of operation. Note, at the end of this operation the tape is properly positioned to undergo a succeeding "PRINT-SPACE" operation if the next character to be printed is located on the inner row.

Although the tape has been stepped so that the character just printed is now directly under the outer typewheel row, a character selection from that row will not overprint because of the next described mode of operation.

(2) If the character to be printed is located on the outer typewheel row, the machine will space the tape first and then print the character. This will be referred to as the "SPACE-PRINT" mode of operation. Note, at the end of this operation the tape is positioned with the just printed character under the outer typewheel row, the same as the finish position of the "PRINT-SPACE" mode of operation. Thus the machine is ready to undergo a succeeding mode of operation which can be either "PRINT-SPACE" or "SPACE-PRINT" depending upon which row contains the character to be printed. In this manner, the resultant printed message will be properly serially recorded on the tape.

Determination of one or the other of the above two briefly described modes is by a sixth bit added to a five unit code signal combination, which in fact makes the code signal a six bit combination. Depending upon the presence or absence of a positive sixth bit pulse in the received signal, the control circuitry, which will be fully described, selects the mode of operation to record the desired character from the proper row.

Another point to be understood is that there are two print hammers, one of which is used only with the inner typewheel row of characters and the other of which is used only with the outer typewheel row of characters.

(3) A third mode of operation is designated the space but no printing mode, i.e., "SPACE-NO PRINT." Thus, if a space code signal is received, there is an automatic inhibiting of the operation of the counting and printing control circuits as a result of which, no printing actuation occurs. Yet at this time, a space signal is immediately directed to the tape feed mechanism, resulting in a spacing of the tape but no printing.

(4) The fourth mode, entitled "MANUAL TAPE FEED," is just what its name implies. This operation is provided by a switch which inhibits counter and printing operations and feeds signals directly to the tape feed mechanism.

As previously mentioned, to hurdle the mechanical speed limitations of tape feed mechanisms, duplicate tape feed devices are provided and their operation is always successively alternate. This is true regardless of which one of the four modes of operation is utilized.

The ink ribbon feed for the typewheel ink ribbon is stepped once for every second printer cycle of operation. The circuitry for this operation is electronic and will not be described herein.

The printer operates from six lines of data, received in parallel, plus a strobe line. As is conventional, each line furnishes one of two signals, sometimes referred to as "yes-no," "mark-space," or "pulse-no pulse." Information can be accepted at the rate of from 0 to 30 characters per second.

For convenience, the exemplary printer has been arranged to receive code signals in the form of five-unit binary code combinations. The source of the signals is not a part of the present invention; it may be a telegraphic transmitter, the output from a data computer or data storage device such as a magnetized tape record. Merely by way of example, a magnetized tape record carrying the binary code information could have five channels recorded across the width of the tape with each channel designating a different position in the five position binary code. In the code, binary digit "1," present at any of the five positions, is represented by a magnetic spot recorded in an appropriate channel on the tape, while the binary digit "0" in any of the five positions is represented as an absence of a magnetic spot in the appropriate channel on the tape. The sixth channel is not used in the binary counter of the printer but instead is used for "odd-even" triggering purposes to select one of the "PRINT-SPACE" or "SPACE-PRINT" modes. A seventh channel can be included on the tape for use as a strobe or synchronization pulse channel and would have a magnetized spot occurring at each point along the tape where the other six information channels comprising a set of binary signals are to be recorded. The code combination jams or pre-sets the counter to a desired count condition. Also, a sixth bit signal line leads to the single stage binary counter No. 6 (also at the top of FIGURE 1) which determines the selection of operation modes 1 and 2 (PRINT-SPACE or SPACE-PRINT), and a seventh input signal line to the strobe input (No. 7 at bottom left of FIGURE 1).

The position detection pulse generated counts correspond to five unit binary code numbers. Many arrangements of the order of characters represented by serially generated binary code combinations are, of course, possible. For example, the 180° out-of-phase positions 1 and 33 on the typewheel and on the sixty-four notch clock disc could both be for the two characters A and B, and the serial pulse count of one from the sixty-four notch wheel as expressed by the five unit binary code would be 00001. This binary code 00001 represents both characters, but the characters are on different rows, e.g., A would be on the inner row of the typewheel and B on the outer row of the typewheel. Similarly, C and D could be represented by a two count pulse, which is the five unit binary code 00011, E and F by the three count pulse or code 00100 and so on for thirty-two sets of two or a total of sixty-four different characters (symbols, numbers, etc.).

*Control circuit and operation*

Inasmuch as the mechanical printer components are actuated by the control circuit, portions of the control circuit pertinent to the present invention will now be described.

Reference will be primarily to FIGURE 1 and the symbolized components such as the binary counter registers, "and" units, delay units, current drivers, etc. The specific manner in which each circuit component accomplishes its function will be understood by those skilled in the art and the transistor bias circuit operation will be clearly apparent from the detail circuit in FIGURE 2.

As has been forenoted, the printer has four modes of operation, "PRINT-SPACE," "SPACE-PRINT," "SPACE-NO PRINT" and "MANUAL FEED-OUT." The circuits to accomplish the first of these modes will be described and includes an exemplary power transistor bias circuit. The circuits for the other modes will not be described herein.

*Print-space mode*

The print-space mode records a character on the inner row of the typewheel 22 and then feeds the tape 40 one step. Because the adjacent two different characters on the typewheel inner and outer rows are represented by a single incoming simultaneous five unit binary code to binary counter 50 and are also represented by a single serial binary count (complement of the simultaneous code) from the clock disc 34, one additional incoming data line 6 is used to determine whether there will be a "print first-space later" operation or a "space first-print later" operation. If no information is received from data line 6 by the sixth register 46, the character desired for selection will be on the inside row 42 of typewheel 22, and accordingly, the character must be printed first and the tape 40 must then be stepped. In the "print first-space later" condition, binary code information is received on lines #1 through #5 to the binary counter registers 51–55 and no signal will be present on line #6 to register 46. At the same instant a "strobe" signal will be received on line 7 which is connected to a 150 microsecond delay 56 to assure that the received data on lines 1–5 is completely entered in the registers 51 through 55 of counter 50.

From the 150 microsecond delay 56, the "strobe" signal pulse passes through a circuit line 57 to several branches, one of which is a ribbon feed divide-by-two register 58 which requires two consecutive pulses to operate a ribbon feed one-shot multi-vibrator 60 of 14 milliseconds duration which in turn feeds a current driving stage 62 to activate a ribbon feed solenoid 64 to move the inking ribbon 66 (see FIGURES 2, 4 and 5). Thus the ink ribbon feed mechanism will be activated once for every other strobe input signal.

The 150 $\mu$s. delayed "strobe" pulse on line 57 is also presented to a "space-no print" blocking gate 68 which, as will be later described, is blocked only when a simultaneous 00000 condition is present in binary counter 50. So long as a character signal is present on input lines 1–5, the blocking gate 68 passes the delayed strobe pulse to an A register 70, cocking the A register 70 to enable acceptance of indexing signal information from the amplifier 41 of the two notched index wheel 22 on the typewheel shaft 24. Cocking of register A pulses a 14 ms. delay one-shot 72 which is tripped to provide a 14 ms. blocking of a reset line 76 to a B register 74, by means of an end-of-count "and" gate 75.

The first index pulse from the pick-up coil 38 of the two notch wheel 32 passes through its amplifier stage 41 to the reset line of the A register 70 which trips and, in turn, trips the B register 74. Tripping of B register 74 through a circuit line 78 opens the "and" gate 79 to the binary counter input line 80, permitting the sixty-four (64) notch clock disc 34 to serially enter its pulse through its amplifier stage 43 and the opened "and" gate 79 into the $2^5$ counter stages of binary counter 50. The serial pulses entered into the $2^5$ counter registers 51–55 complete the count, previously pre-set by the received simultaneous binary code data on lines 1–5, to zero. The final serial pulse from clock wheel 34, which clears the binary counter 50, gives rise to an output of the fifth stage 55 which feeds back through previously described reset line 76 to and through the end-of-count "and" gate 75 to turn off the B register 74, which in turn closes the count "and" gate 79.

If an end-of-count signal on the reset line 76 from binary counter 50 occurs before the 14 millisecond delay 72 (which controls the end-of-count gate 75) has completed its time cycle, the end-of-count gate 75 remains closed and the B register 74 will not be turned off. Accordingly, the sixty-four (64) notch wheel 34 and pick-up 39 will continue to dump pulses through the counter input gate 79 into the $2^5$ counter registers 51 through 55 (which at this stage of the cycle are not longer pre-set) for thirty-two more pulses (180° rotation of typewheel shaft taking 15.2 ms.) and the ensuing end-of-count pulse through line 76 to the now open end-of-count gate 75 will reset the B register 74, closing the count gate 79.

When the B register 74 becomes reset, a signal goes out on a circuit line 81 to a 500 microsecond delay one-shot 82 and prevents the #6 register 46 from being prematurely reset. This same signal from B register 74 on line 81 also goes to three additional units, (1) a paper feed "and" gate 85, (2) a print hammer "and" gate 83 which controls an actuating signal to the print-space (PS) print hammer actuation circuit, and (3) a second print hammer "and" gate 84 which controls an actuating signal to the space-print (SP) print hammer circuit.

In the presently considered print first-space later (PS) condition, the PS print gate 83 has been initially conditioned by the fact that there was no data input on the input line 6 to register 46 and, therefore, when the pulse from B register 74 feeds to the PS print gate 83, the signal passes to a phasing one-shot delay 86 which in turn pulses a one-shot multi-vibrator 87 and a current driven stage 88, which in turn energizes a PS hammer operating solenoid 89. When PS solenoid 89 is energized, the corresponding print hammer 90 (see FIGURE 2A) is caused to record the selected character from the inner typewheel row 42 on the tape 40. The mechanical structure and function of the print hammers will be later described.

Because in this PS mode of operation no data was received on the receive signal line 6 to register 46, the aforedescribed paper feed "and" gate 85 was conditioned at the same time as was the PS "and" gate 83 so that when the pulse comes from B register 74, the signal passes through the feed "and" gate 85 and a pulse is sent to a paper feed divide-by-two register 94 which in turn pulses one of two paper feed one-shots 98 or 100 to trigger a corresponding one of two current drivers 101 or 102, which energizes an associated one of two feed operating solenoids 103 or 104. Successive pulses to the paper feed divide-by-two register 94 operate alternate ones of the two paper feed solenoids 103 or 104.

The specific circuit for energizing the print-space hammer solenoid PS is illustrated in the left-hand portion of FIGURE 2 and in view of its unique biasing arrangement, is now described in detail. The input signal is on lead 400 which is the output signal from phasing one-shot delay circuit 86 of FIGURE 1. The print hammer one-shot multi-vibrator 87 may be composed of a pair of P-N-P transistors 402 and 404. As shown in FIGURE 2, the current driver stage 88 of FIGURE 1 may be composed of a power transistor 406 and a driver transistor 408. The print hammer solenoid coil 89 is connected to the collector terminal 410 of power transistor 406.

The emitter 412 of power transistor 406 may be connected directly to ground and base 414 connected to the emitter 416 of driver transistor 408. The collector of driver transistor is connected through a 25 ohm resistor to a negative 32 volt potential terminal of the power supply. The emitter-collector current conduction path for driver transistor 408 includes emitter 412 and base 414 of power transistor 406.

The base of driver transistor 408 is connected directly to the emitter of multi-vibrator transistor 404. Its collector is connected through a 150 ohm resistor to a negative 20 volt potential terminal of the power supply and its base connected to the collector of multi-vibrator transistor 402 which serves as one feedback path for the multi-vibrator circuit. A second feedback path is from the collector of transistor 404 to the base of transistor 402 and includes the usual resistor-capacitor circuit with a voltage divider including a variable resistor 87 to permit adjustment of the length of time the one-shot multi-vibrator is in its unstable condition.

A novel bias arrangement is provided for transistors 404, 408 and 406 which may consist of conventional silicon diodes 418 and 420 such as those designated commercially SR 162. These diodes have a barrier potential of about 0.6 volt. Each diode is connected directly between the base and emitter of its associated transistor and, in the embodiment illustrated, poled with its anode connected to the base and its cathode connected to the emitter.

With N-P-N transistors, the polarity of diodes 418, 420 and power supply potentials would be reversed accordingly. Diodes 418, 420 are connected in series and through the base-emitter path of transistor 406 to ground and to junction 422 between the collector of transistor 402 and resistor 424 to a negative 20 volt terminal of the power supply.

In normal condition, transistor 402 conducts heavily to provide a slightly positive potential relative to ground at junction 422. The magnitude of this positive potential must be sufficient to exceed the combined barrier potentials of all of diodes 418, 420 to thus assure that their respective transistors are reverse-biased to be non-conducting. A potential of about +4 volts has been found to be satisfactory for the circuit illustrated. As the barrier potential of a germanium transistor is about 0.26 volt, the voltage drop of about 0.6 volt across diodes 418, 420 is sufficient to assure cutoff of transistors 404 and 408, and the positive potential on base 414 of transistor 406 prevents conduction through it.

When a positive going edge of the pulse on input lead 400 is received at the base of transistor 402, transistor 402 cuts off, thereby lowering the potential at junction 422 to about negative 20 volts, and transistor 404 then begins conduction. Driver transistor 408 and power transistor 406 are also triggered "on" and solenoid PS is energized. Thereafter, transistor 402 again becomes conductive due to the negative bias on its base and the remaining transistors are cut off.

In this type of circuit, the power transistor 406 carries about 16 mils while driver transistor carries about 2 mils and multi-vibrator transistor carries about 200 $\mu$amps. Each transistor has to be provided with different bias voltages to operate with these current capacities. In the past, additional voltage in the power supply had to be provided to supply the necessary operating and bias voltages. By use of diodes 418, 420 in this particular type of circuit, it has been possible to eliminate the otherwise necessary circuit components and thus simplify the circuit in material respects.

As is apparent, other solenoid driving circuits, such as those used for the space-print hammer, paper feed and ribbon feed are or may be arranged in a manner similar to the driving circuit for the print-space hammer solenoid, just described, and such circuits therefore will not be described in detail.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination: a power transistor having base, emitter and collector terminals, means connecting one of said terminals to a first reference potential and another of said terminals through a current coil of an electromagnet to a second reference potential; a germanium driver transistor having base, emitter and collector terminals means connecting said driver transistor to have an emitter-collector current path through the base and said one terminal of said power transistor to said first reference potential and through a circuit separate from said inductor to said second reference potential; a silicon diode connected across the base and one terminal of the driver transistor, said diode having a voltage drop when conducting which exceeds the barrier potential of the driver transistor and poled when conducting to prevent current conduction through the driver transistor; and means for selectively applying a potential of a first polarity relative to said first reference potential to the base of the driver transistor to cause forward current conduction through said diode and prevent current conduction through said power transistor and a potential of opposite polarity to the base of the driver transistor to cause conduction through both transistors, said last mentioned means comprising a monostable multivibrator circuit containing third and fourth transistors, each having base, emitter and collector terminals; means for connecting the emitter terminal from said third transistor to the base of the driver transistor; means for connecting the base of said third transistor to the collector terminal of said fourth transistor; a further diode having properties similar to those of said first diode connected across the base and said emitter terminal of said third transistor to be in series circuit arrangement with said first diode and poled in the same direction as said first diode; and means for changing the conduction condition of said multivibrator circuit to control current conduction through said power transistor.

2. A combination monostable multi-vibrator and power transistor circuit for actuating an electro-magnet having a current coil connected to be actuated by the current through said power transistor comprising: a source of potential providing positive, negative and intermediate potentials; a first and second transistor of the P-N-P type, each including a base, an emitter, and a collector electrode and in combination comprising a one-shot multi-vibrator; a first feedback means coupled between the base of said second transistor and the collector of said first transistor; a second feedback means between the collector of said second transistor and the base of said first transistor; a plurality of transistors of the P-N-P type, including a power amplifier transistor connected to control current to said coil, a driver transistor connected to control the conduction of said power amplifier transistor and in turn be controlled by said second transistor; circuit means providing a direct series connection between emitter electrodes and succeeding transistor base electrodes of said plurality of transistors; a means including a diode device coupling the base and emitter electrodes of each one of said plurality of transistors together; the collector of each of said plurality of transistors being coupled to said negative potential source through separate circuits; the emitters of each being coupled to a relatively positive potential source; the reverse cut off bias of all of said plurality of transistors being derived from said first feedback means through the series of diode circuits; the potential derived from the collector of said first transistor, when conducting, being sufficiently positive to support voltage drops across each diode device due to the barrier potential of said diode devices, each of which voltage drops has a magnitude providing reverse bias across the base-emitter circuit of each transistor to cut off conduction through each associated one of said plurality of transistors; and input means coupled to the base of said first transistor to cut off and thereby provide a high negative potential in series to and through the base emitter paths of all of said plurality of transistors.

3. In combination: a power transistor having base, emitter and collector terminals, means connecting one of said terminals to a first reference potential and another of said terminals through a current coil of an electromagnet to a second reference potential; a driver transistor having base, emitter and collector terminals; means connecting said driver transistor to have an emitter collector current path through the base and said one terminal of said power transistor; a first diode connected across the base and one terminal of the driver transistor, said diode having a voltage drop when conducting which exceeds the barrier potential of the driver transistor and poled when conducting to prevent current conduction through the driver transistor; a monostable multivibrator circuit containing third and fourth transistors, each having base, emitter and collector terminals; means connecting the emitter terminal from said third transistor to the base of the driver transistor; means connecting the base of the third transistor to the collector terminal of said fourth transistor; a further diode having properties similar to those of said first diode connected across the base and said emitter terminal of said third transistor to be in series circuit arrangement with said first diode and poled in the same direction as said first diode; circuit means connecting the emitter of said fourth transistor to a third reference potential so that when said fourth transistor is conducting the potential at its collector is sufficient to maintain said first, second and third transistors in a non-conducting condition; and means for changing the conduction condition of said multivibrator circuit to control current through said power transistor.

References Cited by the Examiner

UNITED STATES PATENTS

| | | | |
|---|---|---|---|
| 2,864,904 | 8/1958 | Jensen | 179—171 |
| 2,995,712 | 8/1961 | Montgomery | 330—19 |
| 3,123,746 | 3/1964 | Wachowak | 317—148 |

FOREIGN PATENTS

| | | |
|---|---|---|
| 1,036,315 | 8/1958 | Germany. |
| 1,054,492 | 5/1959 | Germany. |
| 3,025,417 | 3/1962 | Germany. |

MILTON O. HIRSHFIELD, *Primary Examiner.*

ARTHUR GAUSS, J. SILVERMAN, *Assistant Examiners.*